United States Patent [19]

Jensen

[11] Patent Number: 4,708,549
[45] Date of Patent: Nov. 24, 1987

[54] RATTLE-PROOF ANCHOR FITTING FOR SECURING LOADS TO RETAINER TRACK

[75] Inventor: Richard H. Jensen, Torrance, Calif.
[73] Assignee: Ancra Corporation, Hawthorne, Calif.
[21] Appl. No.: 906,679
[22] Filed: Sep. 11, 1986

Related U.S. Application Data

[63] Continuation of Ser. No. 729,486, May 1, 1986, abandoned.

[51] Int. Cl.⁴ .......................... B60P 7/08; B60N 1/08
[52] U.S. Cl. ................................. 410/105; 248/503; 410/116
[58] Field of Search ............... 410/101, 104, 105, 115, 410/116; 244/118.1, 118.6; 248/500, 503; 503.1

[56] References Cited

U.S. PATENT DOCUMENTS

| | | | |
|---|---|---|---|
| 4,230,432 | 10/1980 | Howell | 410/105 X |
| 4,256,424 | 3/1981 | Knox et al. | 410/104 X |
| 4,376,522 | 3/1983 | Banks | 410/105 X |
| 4,396,175 | 8/1983 | Long et al. | 410/105 |
| 4,496,271 | 1/1985 | Spinosa et al. | 410/105 |

Primary Examiner—Robert B. Reeves
Assistant Examiner—Scott H. Werny
Attorney, Agent, or Firm—Edward A. Sokolski

[57] ABSTRACT

An anchor fitting has flat surfaced pads with shoulders extending therefrom and a post portion extending along an axis substantially normal to the flat surfaces of the pads. A fastening device is provided on the post for anchoring a load to a track on which the fitting is removably mounted. The device further includes a screw adjustable plunger and clamp member which can be adjustably positioned by the screw along an axis substantially normal to the flat surfaces of the pads. The fitting is removably retained in a selected position along a slotted track, having a plurality of notched portions separated by narrow neck portions formed by flanges, with the shoulders of the pads and the track slots underneath the flanges and with the plunger lowered by the screw so that it is seated in one of the notched portions of the track with a clamping shoulder portion of the plunger-clamp unit in tight engagement with the top surface of the track. This provides a tight, rattle-proof joinder between the fitting and the track.

5 Claims, 5 Drawing Figures

RATTLE-PROOF ANCHOR FITTING FOR SECURING LOADS TO RETAINER TRACK

This application is a continuation of application Ser. No. 729,486, filed on May 1, 1986, now abandoned.

This invention relates to an anchor fitting for removably securing a load to a track member at a preselected position therealong, and more particularly to such a device which incorporates a screw actuated plunger-clamp member for tightly joining the device to the track so as to obviate rattling of the fitting.

In vehicles such as aircraft, it is desirable to provide means for selectively anchoring various types of loads such as cargo, passenger seats, etc. in various positions along the floor of the aircraft. The anchoring must be reliable to assure that these loads do not become loose durng travel, yet at the same time, it is necessary that it be relatively easy to attach and detach the anchoring device at any selected position in the vehicle to permit versatility in loading and conversion from one type of load to another.

In U.S. Pat. Nos. 4,026,218, issued May 31, 1977 and 4,256,424, issued Mar. 17, 1981, both of which are assigned to ANCRA CORPORATION, the assignee of the present application, such rattleproof anchor fittings are described. In the devices of both of these patents, a separate plunger member is employed for engaging a selected notched portion of the track, there being a totally independent means in each instance for tightly retaining the fitting to the track so as to avoid rattling thereof.

In the U.S. Pat. No. 4,026,218, such rattle-proof joinder between the fitting and the track is provided by means of a cam bar member which is driven into clamping engagement with the top surface of the track by means of an adjustment screw. In the U.S. Pat. No. 4,256,424, the same end result is achieved by means of a "U"-shaped clamp member which has flanges extended therefrom, with the screw being used to drive the flanges against the track.

The device of the present invention affords an improvement over the aforementioned devices of the prior art in that it incorporates the plunger and clamp member in a single unit. This unit is vertically positioned on the fitting by means of an adjustment screw which can be tightened down to both seat the plunger and clamp clamping shoulders, which are alongside the plunger, against the track. Thus, the device of the present invention is of simpler more economical construction than that of the prior art in that a separate plunger element is eliminated and the dual functions provided by the plunger and clamping unit of the prior art are incorporated into a single element.

It is therefore an object of this invention to provide a simpler, more economical rattle-proof anchoring fitting for removably securing a load to a track member.

Other objects of this invention will become apparent as the description proceeds in connection with the accompanying drawings of which, FIG. 1 is a top plan view of a preferred embodiment of the invention;

Figure 1:
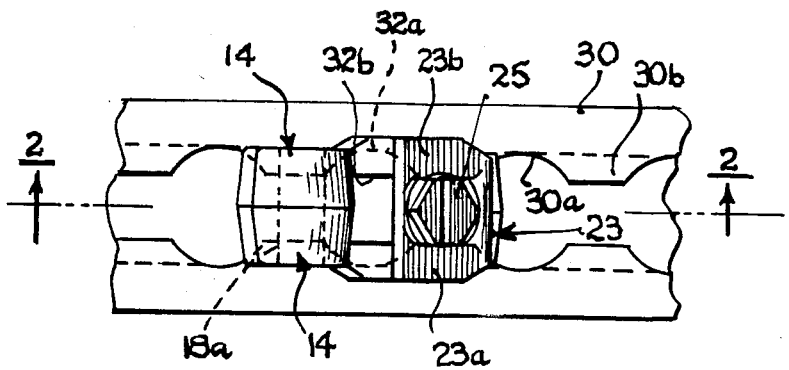

Referring now to the figures, a preferred embodiment of the invention is illustrated:

The anchor fitting includes a main body portion 14, which has a pair of spaced base pads 15 along the bottom portion thereof, these pads having shoulders 15a which extend therefrom, and flat bottom surfaces 15b. At one end of the main body portion is a post portion 18, which extends vertically, (i.e., substantially normal to surfaces 15a). Post portion 18 has an aperture 18a formed therein through which a suitable fastening member may be fitted in securing a load to the fitting which fitting, in turn, is secured to a track member as now to be described.

Shoulders 21a and 21b are formed along the opposite sides of the main body portion 14, directly above base pads 15. Supported on main body portion 14 for vertical motion relative thereto (i.e., along an axis substantially normal) to the flat bottom surface 15b of the pads, is a plunger-clamp member 23 which is vertically positionable by means of screw 25 which threadably engages main body portion 14. Screw 25 is rotatably retained on member 23, in a fixed position relative thereto vertically, by means of snap ring 26 which fits in a groove formed in the screw. The plunger-clamp member 23 is in the general shape of a "U" having a pair of opposing arm portions 23a and 23b. Extending from the bottom surface of plunger-clamp member 23, is a plunger element 32, formed by a pair of opposing projections with similar outer curved surfaces 32a and inner straight flat surfaces, 32b. Inner surfaces 32b fit flush against the side portion of the main body 14 while outer surfaces 32a fit within the notched portions 30a of the support track 30 in mating engagement therewith, as to be explained further on in this specification. Shoulder portions 35a and 35b are formed on the plunger-clamp member directly above plunger element 32 and form clamping surfaces as to be later explained.

Figure 2:
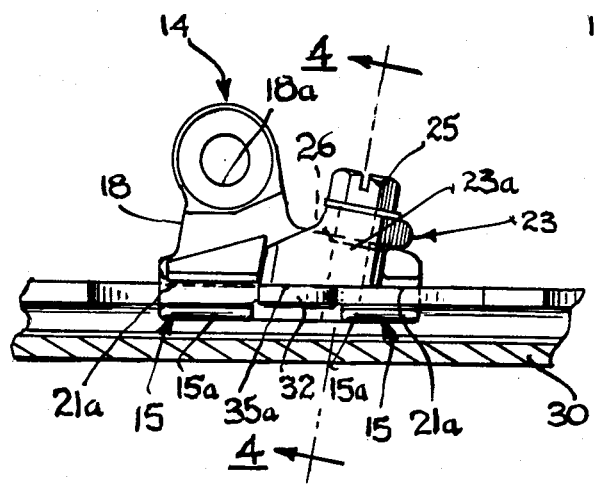
FIG. 2 is a view taken along the plane indicated by 2—2 in FIG. 1.
Figure 3:
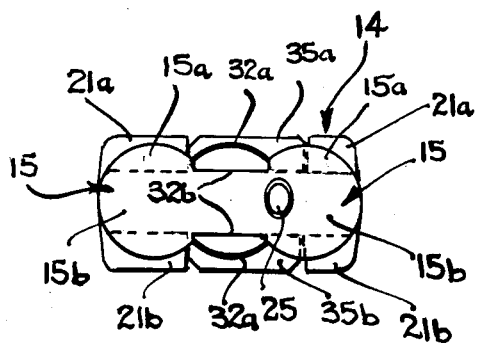
FIG. 3 is a bottom plan view of the preferred embodiment.
Figure 4:
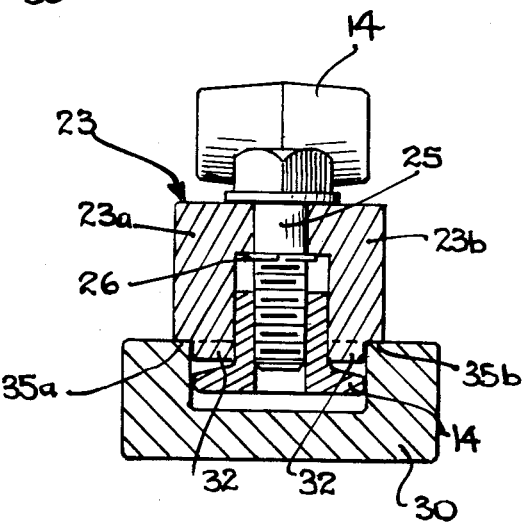
FIG. 4 is a cross-sectional view taken along the plane indicated by 4—4 in FIG. 2.

Referring now particularly to FIGS. 2 and 4, the anchor fitting is retained in track 30, which has notched portions 30a separated from each other by narrow neck portions formed by flanges 30b. Positioning and retention of the anchor fitting in the track is achieved first by turning screw 25 so as to raise the plunger-clamp 23 member upwardly, thereby enabling the setting of the fitting in a desired position along the track. When the fitting is positioned in the desired location on the track, the screw is turned so as to drive the plunger-clamp member downwardly so that the plunger element enters one of notches 30a and with increased tightening down of the screw, the shoulder portions 35a and 35b firmly abut against the top surface of the track in clamping engagement therewith while the top surfaces of the base pads 15 are drawn firmly against the inner walls of flanges 30b of the track. In this manner, the fitting is retaining tightly in the track, such that rattling thereof is obviated.

Figure 5:
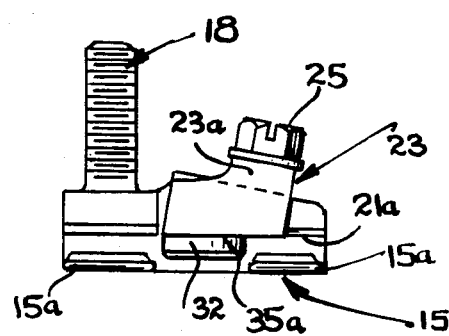
FIG. 5 is a side elevational view of a second embodiment of the invention.

Referring now to FIG. 5, a second embodiment of the invention is illustrated. This second embodiment is generally similar to the first embodiment but differs in the construction of the post portion 18 thereof. In this embodiment, the post portion 18 is threaded so that seats or whatever else is to be attached to the fitting can be threadably attached thereto.

It thus can be seen that the present invention provides a highly economical yet effective means for tightly retaining an anchor fitting to a track member in a manner such that rattling therebetween is avoided.

While the invention has been described and illustrated in detail, it is to be clearly understood that this is intended by way of illustration and example only, and is not to be taken by way of limitation, the spirit and scope of this invention being limited only by the terms of the following claims:

I claim:

1. An anchor fitting for securing a load to a slotted retainer track (30), said track (30) having notched portions (30a) separated by narrow neck portions (30b), said fitting comprising:

a main body portion (14) having opposite sides and base pad means (15) with a substantially flat bottom surface (15) and shoulders (15a) extending therefrom in a direction substantially parallel to said surface, a plunger-clamp member (23) supported on said main body portion (14) for movement relative thereto along an axis substantially normal to the flat bottom surface (15) of the main body portion (14), said plunger-clamp member (23) having a pair of opposing arms, (23a, 23b) which overlap the opposite sides of said main body portion (14), a projection (32) having a curved surface (32a) extending downwardly from each of said arms 23a, 23b towards the base pad means (15), said projection (32a) fitting in the notched portions (30a) of the track (30) in mating engagement therewith, and a shoulder formed on each of said arms (23a, 23b) directly above each of said projections (32), screw means (25) slidably fitted through said plunger-clamp member (23) in rotatable relationship thereto and threadably engaging said body portion (14) for slidably positioning the plunger-clamp member (23) along said axis, and means (26) for restraining said screw means (25) against any substantial longitudinal movement relative to the plunger-clamp member (23), said screw means (25) being rotated in a first direction to drive the plunger-clamp member (23) along said axis to a first predetermined position whereat the plunger-clamp member projections (32) form a plunger which is seated in one of the track notched portions (30a) and the shoulders (35a, 35b) formed on the arms (23a, 23b) and the shoulders (15a) of the base pad means (15) are in firm abutment against the track (30) to secure the fitting to the track (30), said screw means (25) being rotated in a direction opposite said first direction to drive the plunger-clamp member (23) along said axis to a second predetermined position whereat the fitting can be removed from the track (30).

2. The fitting of claim 1 wherein said base pad means comprises a pair of spaced apart pads with the projections of the plunger-clamp member positioned therebetween.

3. The fitting of claim 1 wherein the plunger-clamp member is generally "U"-shaped.

4. The fitting of claim 1 wherein said main body portion further includes a post which extends therefrom in a direction substantially normal to the bottom surface of said base pad means, said post having an aperture formed therein for use in securing a load.

5. The fitting of claim 1 wherein said main body portion further includes a post which extends therefrom in a direction substantially normal to the bottom surface of said base pad means, said post being threaded for use in securing a load.

* * * * *